US007323026B2

(12) United States Patent
Ono

(10) Patent No.: US 7,323,026 B2
(45) Date of Patent: Jan. 29, 2008

(54) SAFETY CABINET FOR ANTIBIOHAZARD

(75) Inventor: Keiichi Ono, Kurokawa (JP)

(73) Assignee: Hitachi Industrial Equipment Systems Co., Ltd., Chiba-shi, Chiba (JP)

(*) Notice: Subject to any disclaimer, the term of this patent is extended or adjusted under 35 U.S.C. 154(b) by 0 days.

(21) Appl. No.: 11/362,848

(22) Filed: Feb. 28, 2006

(65) Prior Publication Data

US 2006/0150593 A1 Jul. 13, 2006

Related U.S. Application Data

(60) Division of application No. 10/981,667, filed on Nov. 5, 2004, now Pat. No. 7,022,151, which is a continuation of application No. 10/650,820, filed on Aug. 29, 2003, now Pat. No. 7,090,709.

(30) Foreign Application Priority Data

Dec. 6, 2002 (JP) ............................ 2002-355234
Jan. 23, 2003 (JP) ............................ 2003-014381

(51) Int. Cl.
*B01D 50/00* (2006.01)

(52) U.S. Cl. ......................... 55/385.2; 55/413; 55/467; 55/472; 55/473; 55/482; 454/187

(58) Field of Classification Search ............... 55/385.2, 55/413, 467, 471, 482, 472, 473; 454/187
See application file for complete search history.

(56) References Cited

U.S. PATENT DOCUMENTS 3,728,866 A 4/1973 Layton
3,811,250 A * 5/1974 Fowler, Jr. .................. 96/422
4,050,368 A 9/1977 Eakes
4,548,627 A 10/1985 Landy
4,832,717 A 5/1989 Peters
5,316,560 A 5/1994 Krone-Schmidt
5,665,128 A 9/1997 Peters et al.
6,368,206 B1 4/2002 Hunter
6,517,428 B1 2/2003 Murray et al.
6,626,971 B1 9/2003 Forbert et al.
6,660,054 B2 12/2003 Manna

FOREIGN PATENT DOCUMENTS

| | | |
|---|---|---|
| JP | 6297356 | 10/1994 |
| JP | 2577751 | 11/1996 |
| JP | 2883420 | 2/1999 |
| JP | 2000346418 | 12/2000 |
| JP | 200279118 | 3/2002 |

* cited by examiner

*Primary Examiner*—Robert A. Hopkins
(74) *Attorney, Agent, or Firm*—Antonelli, Terry, Stout & Kraus, LLP.

(57) ABSTRACT

A safety cabinet which can prevent contaminated air from leaking from a working space through the periphery of a front shutter, and which can prevent outside air from entering the working space has a peripheral structure part surrounding the working space formed with air suction ports in a part opposed to the inner surface of the front shutter connected to a negative pressure passage formed outside of the working space. The negative pressure passage guides air sucked through the air suction ports from the inside and the outside of the working space, toward a filter for purification of the air.

2 Claims, 13 Drawing Sheets

PART A

SECTIONAL VIEW ALONG LINE B-B

PART A

SECTIONAL VIEW ALONG LINE B–B

SECTIONAL VIEW ALONG LINE B-B

PART A

SECTIONAL VIEW ALONG LINE B-B

DETAILED VIEW OF PART A

DETAILED VIEW OF PART A

DETAILED VIEW OF PART A

SAFETY CABINET FOR ANTIBIOHAZARD

CROSS REFERENCE TO RELATED APPLICATION

This application is a divisional application of U.S. Ser. No. 10/981,667, filed Nov. 5, 2004, now U.S. Pat. No. 7,022,151 which is a continuation application of U.S. Ser. No. 10/650,820, filed Aug. 29, 2003, now U.S. Pat. No. 7,090,709 the contents of which are incorporated herein by reference.

BACKGROUND OF THE INVENTION

The present invention relates to a clean bench for preventing occurrence of a hazard which is caused through treatment of microorganisms or pathogenic organisms during genetic manipulation for medical treatment, pharmaceutics or the like, that is, it relates to a safety cabinet for countermeasures to biohazards.

Heretofore, there has been used, as a countermeasure for biohazards, a safety cabinet which isolates microorganisms or pathogenic organisms from a human body or an environment. As to this safety cabinet, there may be used a safety cabinet of a biohazard countermeasure class II type which satisfies or conforms to JIS K3800. This cabinet is provided with an openable front shutter which is opened for accessing a working space defined in the cabinet in order to set or remove a laboratory instrument into or from the working space. JIS K3800 stipulates that no air stream leaks by way of rail parts at upper and lower side edges of the front shutter and by way of a seal wiper at the upper side edge thereof. In an example of the configuration of a conventional safety cabinet, the seal wiper is provided against the inner surface of the shutter so as to prevent leakage of any air stream and entrance of microorganisms into the working space from the outside and as well to prevent leakage of microorganisms and pathogenic organisms from the working space to the outside.

FIGS. 7*a* to 8*b* show an example of the configuration of a conventional safety cabinet, that is, FIG. 7*a* is a vertical sectional view illustrating the safety cabinet, FIG. 7*b* is a partly broken front view thereof, FIG. 8*a* is an enlarged vertical sectional view illustrating a part of the safety cabinet around a front shutter 9 and FIG. 8*b* is an enlarged cross-sectional view thereof. Referring these figures, there are shown the safety cabinet 1' a workbench 2, a working space 3, an exhaust air HEPA filter (High Efficiency Particulate Air filter) 4, an intake air HEPA filter 5, a blower 6, a blow-off rectifying vanes 7, a seal wiper 8, the front shutter 9, blow-off air 12, inflow air 13, a positive pressure contamination plenum 14, a negative pressure contamination plenum 15, and an air suction port 18. The inflow air 13 sucked into a space below the front shutter 9 flows below the workbench 2 and in rear of the working space 3, and then sucked into the blower 6. The thus sucked air is mixed therein with biological specimens and pathogenic organisms which have been treated in the working space 3. The pressure in the air introduction part on the suction side of the blower 9 becomes negative, and accordingly, the biological specimens and the pathogenic organisms are sucked thereinto. Thus, the space 15 where negative pressure air contaminated with the biological specimens and the pathogenic organisms flows is the so-called negative pressure contamination plenum 15. Further, air blown off from the blower 6 is fed into the closed space 14 in which the air is pressurized by the blower 6 so as to have a positive pressure, and is contaminated with the biological specimens and the pathogenic organisms and which is therefore the so-called positive pressure contamination plenum 14. The positive pressure air from the positive pressure contamination plenum 14 is filtered by the intake air HEPA filter 5 so as to be turned into purified blow-off air 12 which is fed into the working space 3. The blow-off air 12 to be fed into the working space 3 is rectified by the flow-off rectifying vanes 7 for uniform distribution of blow-off velocities. The inflow air 13 sucked into the opening of the working space 3 below the front shutter 9 and the blow-off air blown off through the rectifying vanes 7 flow through the negative pressure contamination plenum 15. Then, a part thereof is filtered by the exhaust air HEPA filter 4 so as to remove dust and dirt including the biological specimens and the pathogenic organisms and is then discharged outside of the safety cabinet 1'. The exhaust air HEPA filter 4 has two roles, that is, filtering air from the positive pressure contamination plenum 14 into which air is fed by a positive pressure of the blower 6 and discharging the same outside of the safety cabinet 1', and filtering air in the safety cabinet 1' into which air is fed by way of the negative pressure contamination plenum 15 by a blower (which is not shown) provided outside of the plenum, and discharging the same outside of the safety cabinet 1'. The worker who treats the biological specimens and the pathogenic organisms looks into the working space 3 through the intermediary of the front shutter 9, and inserts his hands thereinto through the opening below the front shutter 9 so s to carry out the treatment thereof within the working space 3. The seal wiper 8 is provided between a partition wall defining the working space 3 and the front shutter 9 so as to prevent inflow of the outside air into the working space 3 and flow-out of the inside air from the safety cabinet 1'. Air suction ports 18 are provided on opposite sides of the opening below the front shutter 9 in order to prevent disturbance of air streams both sides of the opening. Further, the front shutter 9 is inclined by an angle of about 10 deg. with respect to a vertical plane in order to facilitate observation into the working chamber 3 by the worker. Either of JP-B2-2,883,420, JP-A-6-297356 and JP-A-2000-346418 discloses a safety cabinet having a front shutter 9 provided thereto with a means for preventing inflow of the outside air and outflow of the inside air. Specifically, JP-B2-2,883,420 discloses such a configuration that a seal wiper is provided between the front shutter and a partition wall of the working space so as to keep gas-tightness, and JP-A-6-297356 discloses a workbench in which negative pressure is effected in a coupling part between an air supply/discharge unit and a working chamber unit, and an air volume is adjusted by a damper in the air supply/discharge unit so as to introduce the outside air into the working chamber unit while JP-A-2000-346418 discloses such a configuration that negative pressure is effected in a negative pressure air intake passage within a suction duct which is provided in the inner peripheral edge of a glass window in a partition wall defining a working space so as to cause air in the isolator to flow into the suction duct from a suction port through an air-permeable seal packing in order to prevent the air in the isolator from leaking into the outside at the periphery of the window.

Further, the worker who carries out experiments with the use of a safety cabinet, and who inserts his hands in the working space through the front opening in order to carry out the experiments, has to hold his hands for a long time until the experiments is completed, and accordingly, he is tired so as to rest his hands on the bottom surface of the workbench, resulting in blockage of air-suction ports. This causes disturbance of air streams, and as a result, the biological specimens and the pathogenic organisms leak outside of the safety cabinet from the working space, or various germs enters into the working chamber from the outside through the opening so as to cause contamination.

JP-A-2002-079118 discloses a workbench having arm holders for resting the arms at predetermined positions in order to prevent the dropped arms from blocking the air suction ports.

JP-B2-2,577,751 discloses a workbench which is provided at its front face with protrusions so that the front opening is located at a level higher than the bottom surface of the workbench in order to prevent the arms from blocking the air-suction ports even though the arms are dropped onto the bottom surface of the workbench.

Of these above-mentioned conventional safety cabinets, the safety cabinet shown in FIGS. 7*a* to 8*b*, has the seal wiper 8 made of rubber or resin, and accordingly the seal wiper 8 is likely to be readily damaged due to a friction between itself and the front shutter. If it is damaged, entrance of the outside air and leakage of air from the inside to the outside of the safety cabinet cannot be avoided. Thus, the seal wiper 8 should be periodically replaced with new one. Further, since the air suction ports 18 are merely provided at both side ends of the opening below the front shutter 9, there cannot be prevented both occurrence of turbulence in the corner parts between the front shutter 9 and the side surfaces 3*a*' of the working space 3, and leakage of air through the rails 10 for the front shutter 9.

Further, there may be a possibility of leakage of air from corner parts between the shutter rails 10 and the seal wiper 8 at the upper end of the partition wall of the working space 3. Further, the front shutter 9 is inclined at its front surface by an angle of 10 deg. with respect to a vertical plane. Burble due to the inclined structure of the front shutter 9 is caused within the working space 3. In general, it has been known that the space which is widened in the flowing direction causes air to peel off along the inner wall parts of the passage if the passage is widened on both sides thereof by an angel of not less than about 4 to 5 deg. (about 2 to 2.5 deg on one side). In order to prevent air from peeling off, such a countermeasure that the velocities of air streams 12 blown off around the front shutter 9 are increased is taken. This countermeasure causes an increase in the velocity of the air in the working space 3 around the front shutter 9, and as a result, air is more likely to leak from the upper part of the front shutter 9 and around the front shutter rail 10 at both sides of the front shutter 9. Further, in the configurations of the safety cabinets disclosed in JP-B2-2,883,420 and JP-A-2000-346418, the gas-tightness of the working space is held or air in the isolator is prevented from leaking outside thereof, and accordingly, seal packing is required between the front shutter or the glass window and the partition wall of the working space. Further, JP-A-6-297356 discloses the configuration of a clean workbench in which the working chamber unit and the supply/discharge unit are fastened to each other, which effects negative pressure for preventing leakage of contaminants from the supply/discharge unit caused by the fastening structure, but this configuration is not the one which prevent leakage of air or entrance of air around the front shutter in the working chamber unit.

Further, in the above-mentioned conventional safety cabinet (JP-B2-2,883,420), the arm holders provided in front of the workbench hinder laboratory instruments from being brought into and out from the working space. Further, there has been raised a problem of inferior work efficiency of sterilization or disinfection for protrusions of the arm holders provided in front of the workbench.

FIG. 17 shows in detail the front opening of the conventional safety cabinet. When the worker inserts his arms into the working space so as to treat biological specimens or pathogenic organisms in the safety cabinet, the arms 101' are extended into the working space 3 from the center part of the front opening 64 so that the air streams 92' wrap around the arms while the air is sucked from the working space 3 and the outside of the safety cabinet through suction slits 66' (See dotted lines in FIG. 17). If experiments carry out for a long time so as to tire the worker who drops his arms 101', the arms 101' abuts against the inlet opening part 67' of the working bed, and accordingly, it does not directly block the suction slits 66. In general, the workbench 2' has a height which is set to 750 mm in view of easily execution of experiments and the working efficiency for the human. However, the conventional safety cabinet shown in FIG. 17 has the inlet part 67 which is higher than the working surface of the workbench by 30 to 40 mm, resulting in discomfortability during working.

BRIEF SUMMARY OF THE INVENTION

The present invention is devised in view of the above-mentioned problems inherent to the conventional technology in order to achieve the following tasks in a safety cabinet such as a cabinet for anti-biohazard Class II, (1) biological specimens or pathogenic organisms are prevented from leaking around the front shutter, or various germs are prevented from entering from the outside of the safety cabinet in order to avoid infection, (2) the worker can easily observe the inside of the working space, (3) the air streams in the working space can be smooth and uniform so as to prevent cross contamination among germs within the working space, and (4) the necessity of inspection and replacement of the seal wiper can be eliminated.

An object of the present invention is to provide a safety cabinet for anti-biohazard which can minimize the possibility of contamination even though experiments for biological specimens or pathogenic organisms are carried out for long time so as to cause a deficiency in treatment due to tiredness of the worker.

To the end, according to the present invention, there is basically provided a safety cabinet for anti-biohazard, including a working space defined and surrounded by a peripheral structure portion, a front shutter having an inner surface, for the working space, and a negative pressure passage outside of the working space, comprising air suction ports connected to the negative pressure passage, provided in the peripheral structure portion in a part opposed to the inner surface of the front shutter, for sucking air between the inner surface of the front shutter and the peripheral structure portion, and a filter for purifying air which is sucked from the inside of the working space and the outside of the safety cabinet through the air suction ports and which is led thereto through the negative pressure passage, wherein leakage of air from the inside to the outside of the safety cabinet around the front shutter, and entrance of air into the working chamber from the outside of the safety cabinet are prevented. Specifically, according to a first aspect of the present invention, there is provided a safety cabinet for anti-biohazard, including a front shutter having an inner surface, and a working chamber inside of the front shutter, defined and surrounded by a peripheral structure portion, comprising a filter for filtering contaminated air, a negative pressure passage provided outside of the working space, for introducing inflow air to the filter under a negative pressure, air suction ports connected to the negative pressure passage and provided in the peripheral structure portion in a part opposed to the inner surface of the front shutter, for sucking air between the inner surface of the front shutter and the peripheral structure portion, wherein air which is sucked from the inside and the outside of the working space through the air suction ports flows into the negative pressure passage so as to be led to the filter for purification. According a second aspect of the present invention, there is provided a safety cabinet of anti-biohazard, including a front shutter having an inner surface and a working space inside of the front shutter, defined and surrounded by a peripheral structure portion, comprising a blowing means for sucking air and blowing off the air, a pressure chamber into which the air is blown from the blowing means so as to create a positive pressure condition, a first filter for filtering the air from the pressure chamber, blow-off rectifying vanes for rectifying the air from the filter and passing the air into the working chamber, a workbench having a discharge port and located in the working chamber, for carrying thereon an objected to be worked, a second filter for filtering air discharged outside of the safety cabinet, a negative pressure passage provided outside of the working space, and leading inflow air therein to the second filter or the blowing means under negative pressure, air suction ports connected to the negative pressure passage, formed in the peripheral structure portion in a part opposing the inner surface of the front shutter, for sucking air between the peripheral structure potion and the inner surface of the front shutter, wherein air inside and outside of the working space, sucked through the air suction ports are led through the negative pressure passage and into the first and second filter for purification before it is fed to the working space or it is discharged from the outside of the safety cabinet. According to a third aspect of the present invention, there is provided a safety cabinet for biohazard, including a front shutter having an inner surface and a front part inclined with respect to a vertical plane, and a working space inside of the front shutter, defined and surrounded by a peripheral structure portion, a filter for filtering contaminated air, a negative pressure passage provided outside of the working space, for guiding inflow air into the filter, air suction ports connected to the negative pressure passage, formed in the peripheral structure portion in a part opposed to the inner surface of the front shutter, for sucking air between the peripheral structure and the inner surface of the front shutter, wherein air from the inside and outside of the working chamber, sucked through the air suction ports flows into the negative pressure passage and then into the filter for purification. According to a fourth aspect of the present invention, in the safety cabinet stated in any one of the first to third aspect of the present invention, the above-mentioned air suction ports are formed on opposite sides of the working space. Further, according to a fifth aspect of the present invention, in any one of the safety cabinet as stated in the first to third aspects of the present invention, the above-mentioned air suction ports are constituted by through-holes formed in the upper, and opposite sides of the working space. Further, according to a sixth aspect of the present invention, in the safety cabinet as stated in any one of the first to third aspects of the present invention, the air suction ports are formed in a body casing.

Further, in order to achieve the above-mentioned tasks, according to the present invention, there is provided a safety cabinet having a front opening which includes a suction port having a suction surface, wherein a surface which is inclined downward further, outward of the working space, is formed in the suction surface. With this configuration even if the worker sets his arms on the inclined surface, the air suction ports in the workbench can be ensured since the worker's arms are obliquely laid.

That is, according to the present invention, there is provided a safety cabinet comprising a first housing including a working space, a workbench formed therein with air suction ports on the front side of the working space, a front shutter provided in front of the working space, and a front opening connected to the working space and provided below the front shutter, a second housing accommodating therein air supply system instruments for supplying purified air into the working chamber through the intermediary of a first air purifying means, exhaust system instruments for discharging air outside of the working space from a circulation passage connected to the working chamber through the second air purifying means, wherein the workbench has an inclined part which is inclined downward further outward of the working space, between the air suction port and the front opening.

Further, in the safety cabinet according to the present invention, the air suction port in the workbench is attached at its inlet port surface with suction slits.

Further, in the safety cabinet according to the present invention, the air suction port in the workbench is attached, below its inlet port, with suction slits.

Further, in the safety cabinet according to the present invention, the above-mentioned inclined part has an angle of 5 to 40 deg. with respect to a horizontal direction. Further, in the safety cabinet according to the present invention, the air-suction port in the workbench has a topmost part which is higher than the surface of the workbench.

Further, in the safety cabinet according to the present invention, an auxiliary air suction port is formed below the air suction port. Further, in the safety cabinet according to the present invention, the above-mentioned inclined part is provided at a position corresponding to the center part of the working chamber.

Explanation will be hereinbelow made of preferred embodiments of the present invention with reference to the accompanying drawing in which:

Other objects, features and advantages of the invention will become apparent from the following description of the embodiments of the invention taken in conjunction with the accompanying drawings.

DETAILED DESCRIPTION OF THE INVENTION

Figure 1B:
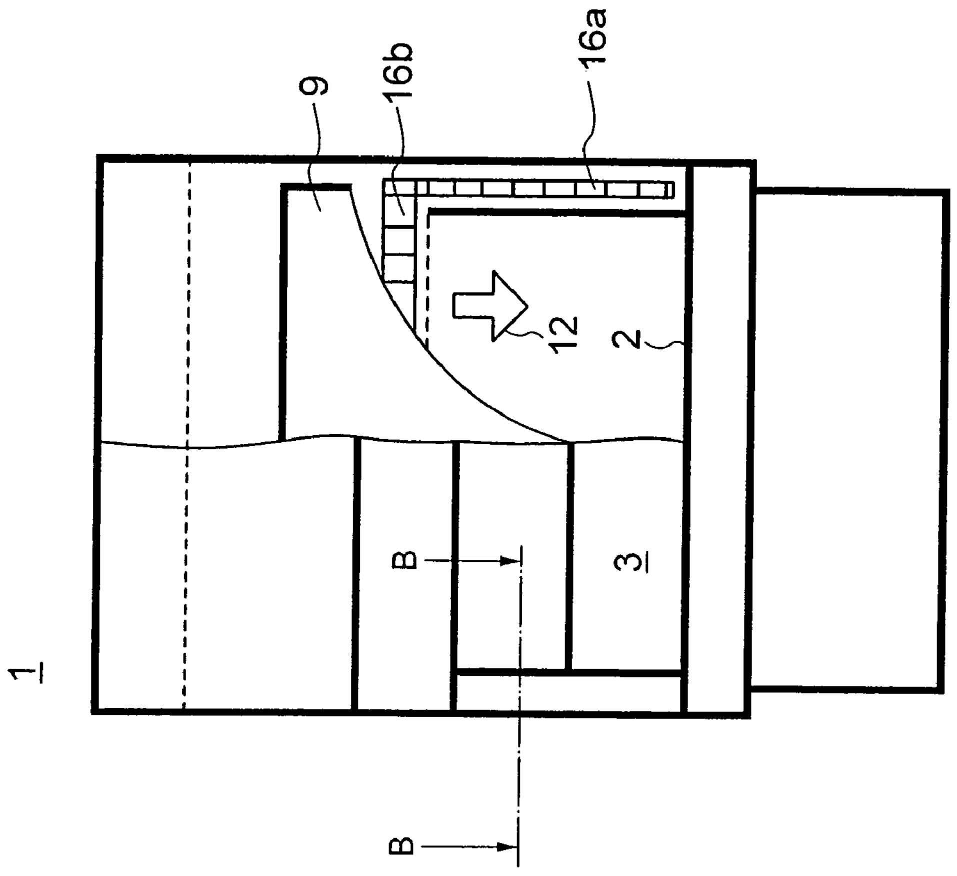
FIG. 1*b* is a partly broken front view illustrating the safety cabinet shown in FIG. 1*a;*

Explanation will be hereinbelow made of embodiments of the present invention with reference to the drawing.

Figure 1A:
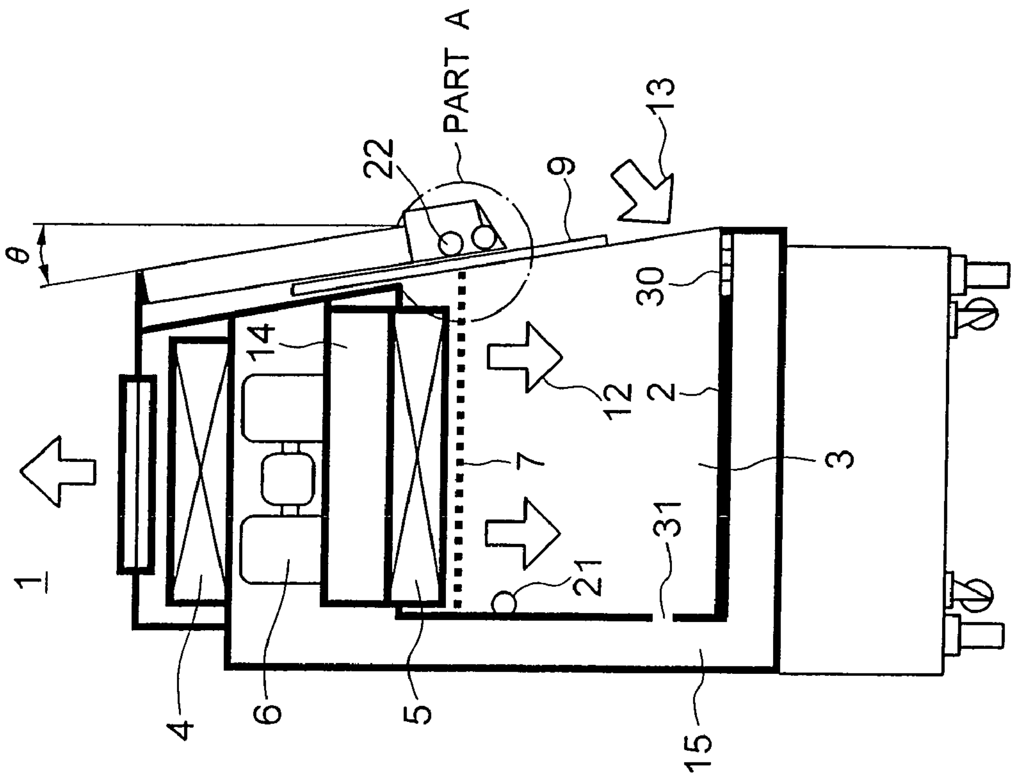
FIG. 1*a* is a vertical sectional view illustrating a safety cabinet in the first embodiment of the present invention.
Figure 2A:
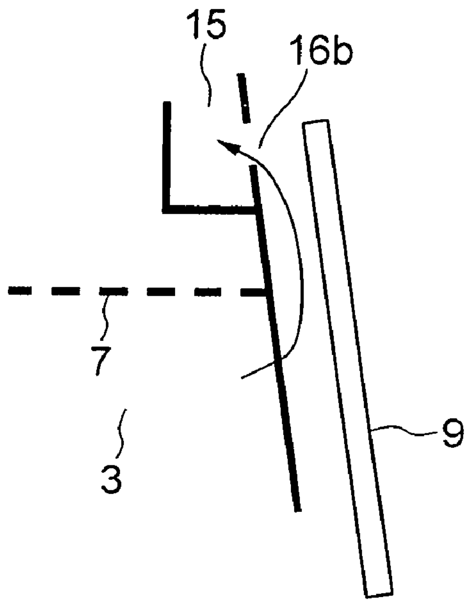
FIG. 2*a* is an enlarged sectional view illustrating a part A in FIG. 1*a;*
Figure 2B:
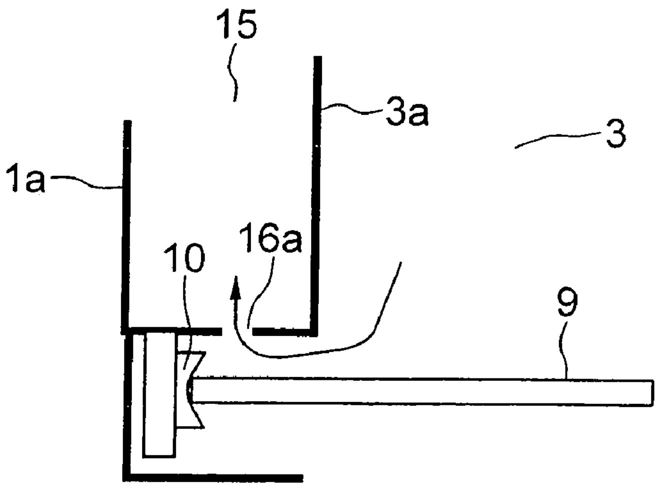
FIG. 2*b* is an enlarged sectional view along line B-B in FIG. 1*b;*

FIGS. 1*a* to 1*b* are views for explaining a first embodiment of the present invention. FIG. 1*a* is a vertical sectional view illustrating a safety cabinet, FIG. 1*b* is a front view illustrating the safety cabinet, FIG. 2*a* is an enlarged view illustrating a part in FIG. 1*a*, and FIG. 2*b* is a sectional view along line B-B in FIG. 1*b*.

In the first embodiment, air suction ports opposed to the inner surface of a front shutter are provided in the upper part and opposite side parts of a working space.

Referring to FIGS. 1*a* to 2*b*; there are shown a safety cabinet 1, a body casing 1*a* of the safety cabinet 1, a workbench 2, a working space 3, a side surface 3*a* of the working space 3, an exhaust air HEPA filter 4, an intake air HEPA filter 5, a blower 6 as a blowing means, blow-off rectifying vanes 7, a front shutter 9, air 12 blown into the working space 3, inflow air 13 from the outside of the safety container, a positive pressure contamination plenum 14, a negative pressure contamination plenum 15 in the form of a negative pressure passage, air suction ports 16*a*, 16*b* which are formed in a peripheral structure portion surrounding the working space 3 and provided on a member defining the working space 3, in parts opposed to the inner surface of the front shutter 9, an internal illumination lamp 21, an external illumination lamp 22, and an exhaust port 30 formed in the surface of the workbench 2, an exhaust port 31 formed in a member defining the working space, at the rear surface side of the safety cabinet. The air suction ports 16*b* are formed in the peripheral structure portion surrounding the working space 3, at the upper side thereof, and the air-suction ports 16*a* are formed in the peripheral structure portion surrounding the working space 3, at opposite sides thereof. Further, the air suction ports are through-holes, respectively. The front shutter 9 has a front surface part which is inclined with respect to a vertical plane by an angle θ in order to allow the worker to easily observe the inside of the working space 3. The angle θ falls in a range from about 3 to 45 deg. where the worker can easily observe the inside of the working space 3. Further, the exhaust port 30, the exhaust port 31 and the air suction ports 16*a*, 16*b* are all connected to the negative contamination pressure plenum 15. The inflow air 13 taken into the working space 3 from a space below the front shutter, flows through the exhaust port 30, then flows below the workbench 2 and in rear of the working space 3, and is finally sucked into the blower 6. The air sucked into the blower 6 is mixed therein with biological specimens and pathogenic organisms in the working space 3 when the air flows through the latter. Since a negative pressure space, that is, the negative pressure contamination plenum 15 is built up on the air suction side of the blower 6, and a positive pressure space, that is, the positive pressure contamination plenum 14 is built up on the discharge side of the blower 6 due to the pressurization by the blower 6. The air blown off from the blower 6 is pressurized in the positive pressure contamination plenum 14, and is then led through the exhaust HEPA filter 5 for removing dust including the biological specimens and the pathogenic organisms from the air which is therefore turned into purified air. The purified air is rectified by the blow-off rectifying vanes 7 and is fed into the working space 3 as blown-off air. The blow-off rectifying vanes 7 allows the velocity distribution of blown-off air to be uniform due to the rectification thereby. The air including the blown-of air 12 flows into the negative pressure contamination plenum 15 through the exhaust port 30, the exhaust port 3*a*, and the air suction ports 16*a*, 16*b* formed in the part opposed to the inner surface of the front shutter 9. The air having flown into the negative pressure contamination plenum 15 through the exhaust port 30 and the exhaust port 31 is sucked into the blower 6, and is then pressurized in the positive pressure contamination plenum 14. Then, it is led through the intake air HEPA filter 5 so as to remove dust including the biological specimens and the pathogenic organisms, and is therefore turned into the purified air which is again fed into the working space 3 as blown-off air 12 after it is rectified by the blow-off rectifying vanes 7. The air between the periphery of the working space 3 and the inner surface of the front shutter mainly flow into the air suction ports 16*a*, 16*b*. The air having flown into the negative pressure contamination plenum 15 is filtered by the exhaust HEPA filter 4 so that dust including the biological specimens and the pathogenic organisms is removed therefrom, and is then discharged outside of the safety cabinet as purified air. In the first embodiment, the peripheral structure portion of the working space 3 which is formed therein with the air suction ports 16*a*, 16*b* is provided in a part of the body casing 1*a*. The air-suction ports 16*a*, 16*b* effect a negative pressure therein since they are connected to the negative pressure contamination plenum 15, that is, suction air streams are created. Further, the air which has leaked outside of the working space 3 around the front shutter rails 10 through gaps between the front shutter rails 10 and the front shutter 9, since a turbulent flow condition is effected at the inner surface of the front shutter 9 on the peripheral structure portion side surrounding the working space 3, as in the conventional configuration, can be sucked into the air suction ports 16*a*, 16*b* so as to be prevented from leaking outside of the safety cabinet, and further, the air which is to enter into the working space 3 from the outside is also sucked into the air suction ports 16*a*, 16*b* so as to be prevented from flowing inward of the working space 3. Thus, it is possible to aim at physically isolating the air within the working space 3 from the air from the outside. Further, the above-mentioned air suction ports 16*a*, 16*b* can eliminate the above-mentioned turbulent flow condition on the peripheral structure side, and accordingly, have a role of smoothing the air flow in the working space 3.

With the configuration of the first embodiment, due to suction of air on the inner surface side of the front shutter 9 by the air suction port 16*a*, 16*b*, the air in the working space 3 can be prevented from leaking outside of the safety cabinet through gaps between mating parts, that is, the front shutter rails 10 and the front shutter 9. As a result, the air in the working space 3 flows through the negative pressure contamination plenum 15 and is then discharged outside of the safety cabinet through the exhaust HEPA filter 4, thereby it is possible to prevent the biological specimens and the pathogenic organisms from leaking outside of the safety cabinet. Thus, it is possible to prevent infection by the specimens and the organisms. Further, it is possible to inhibit entrance of air outside of the safety cabinet. In view of this point, thereby it is possible to provide a safety cabinet having a high degree of safety. Further, due to the suction of air by the air-suction ports 16*a*, 16*b*, it is possible to restrain peel-off of air streams in the working space 3, which is caused by the inclined structure of the front shutter 9. Thus, a smooth air flow condition with no peel-off of air is effected in the working space 3, and accordingly, cross-contamination among different germs within the working space 3 can be prevented, and further, a predetermined work can be carried out while the worker can easily observe the inside of the working chamber 3. Further, since no consumable things having short use lives, such as a seal wiper are used, the necessity of the inspection and replacement of these items can be eliminated.

Figure 3A:
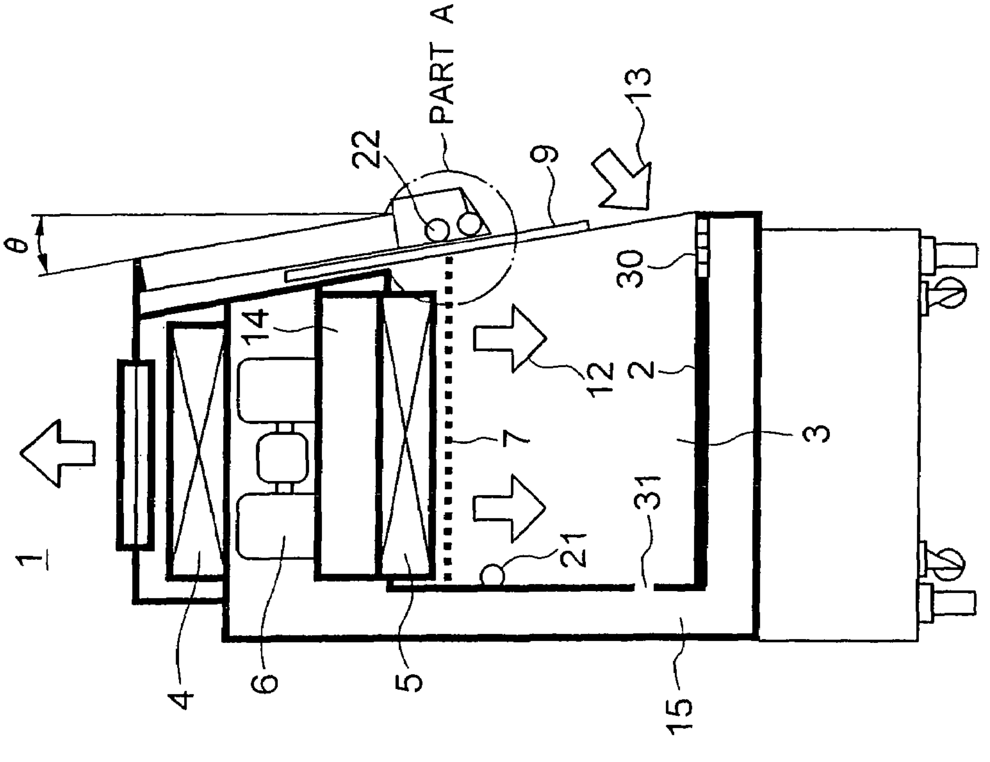
FIG. 3*a* is a vertical sectional view illustrating a safety cabinet in a second embodiment of the present invention.
Figure 3B:
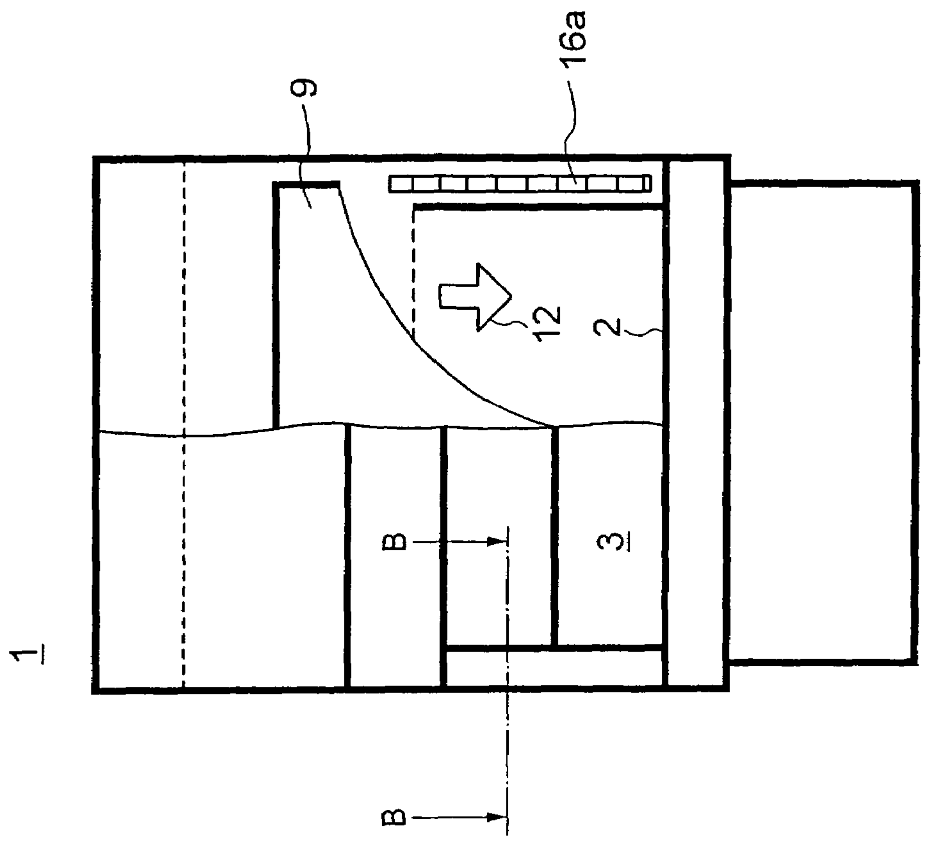
FIG. 3*b* is a partly broken front view illustrating the safety cabinet shown in FIG. 3*a;*
Figure 4A:
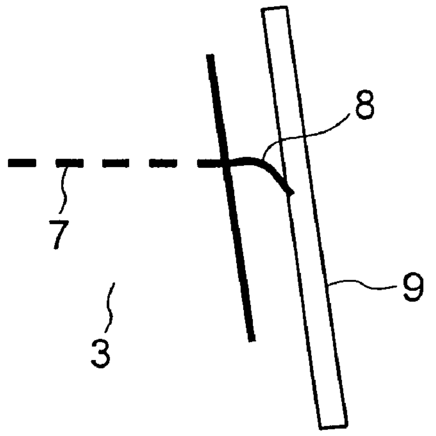
FIG. 4*a* is an enlarged sectional view illustrating a part A in FIG. 3*a;*
Figure 4B:
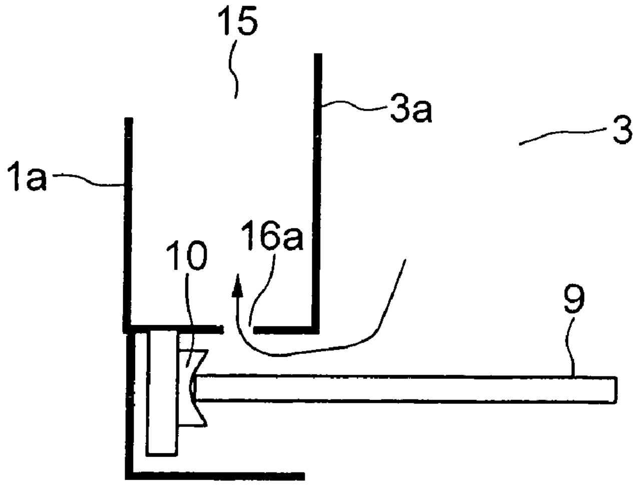
FIG. 4*b* is an enlarged sectional view along line B-B in FIG. 3*b;*

FIGS. 3*a* to 4*b* are views for explaining a second embodiment of the present invention. FIG. 3*a* is a vertical sectional view illustrating a safety cabinet, FIG. 3*b* is a front view illustrating the safety cabinet shown in FIG. 3*a*, FIG. 4*a* is an enlarged view illustrating a part A in FIG. 3*a*, and FIG. 4*b* is an sectional view along line B-B in FIG. 3*b*.

In the second embodiment, the air suction ports in a part opposed to the inner surface of the front shutter 9 are provided along the front shutter rails at the opposite sides of the working space, and a seal wiper is also provided.

Referring to FIGS. 3*a* to FIG. 4*b*, there are shown a seal wiper 8 for inhibiting entrance of the outside air and discharge of the inside air, and air suction ports 16 provided in parts which are opposed to the inner surface of the front shutter 9 and which are along the front shutter rails in opposite side parts of the working space 3. No suction ports corresponding to the suction port 16*b* in the first embodiment are provided at the upper side of the working space 3. Except that mentioned above, the configuration of the second embodiment is the same as that of the first embodiment, and like reference numerals are used to denote the like parts to those in the first embodiment. Further, the working of the air suction ports 16*a* and the other parts in the second embodiment are also the same as that of the first embodiment.

With the configuration of the second embodiment, due to the suction of air by the air suction ports 16*a* on the inner surface side of the front shutter 9, it is possible to prevent the air in the working space 3 from leaking through gaps between the front shutter 9 and the front shutter rails 10 and the like. As a result, the air in the working space is led through the negative pressure plenum 15 and the exhaust HEPA filter 4, and is then discharged outside of the safety cabinet, and accordingly, it is possible to prevent leakage of the biological specimens and the pathogenic organisms outside of the safety cabinet, thereby it is possible to prevent infection. Further, due to the suction of air by the air suction holes 16*a*, it is possible to restrain occurrence of peel-off of air streams in the working space 3, which is caused by the inclined structure of the front shutter 9. Thus, a smooth air flow condition with no peel-off of air streams can be effected in the working space 3, and accordingly, cross-contamination among different germs within, for example, in the working space 3 can be prevented, and further, the worker can carry out operation in such a condition that the observation of the inside of the working space 3 can be facilitated. Further, the structure of the body casing in which the negative pressure contamination plenum 15 can be simplified.

Figure 5B:
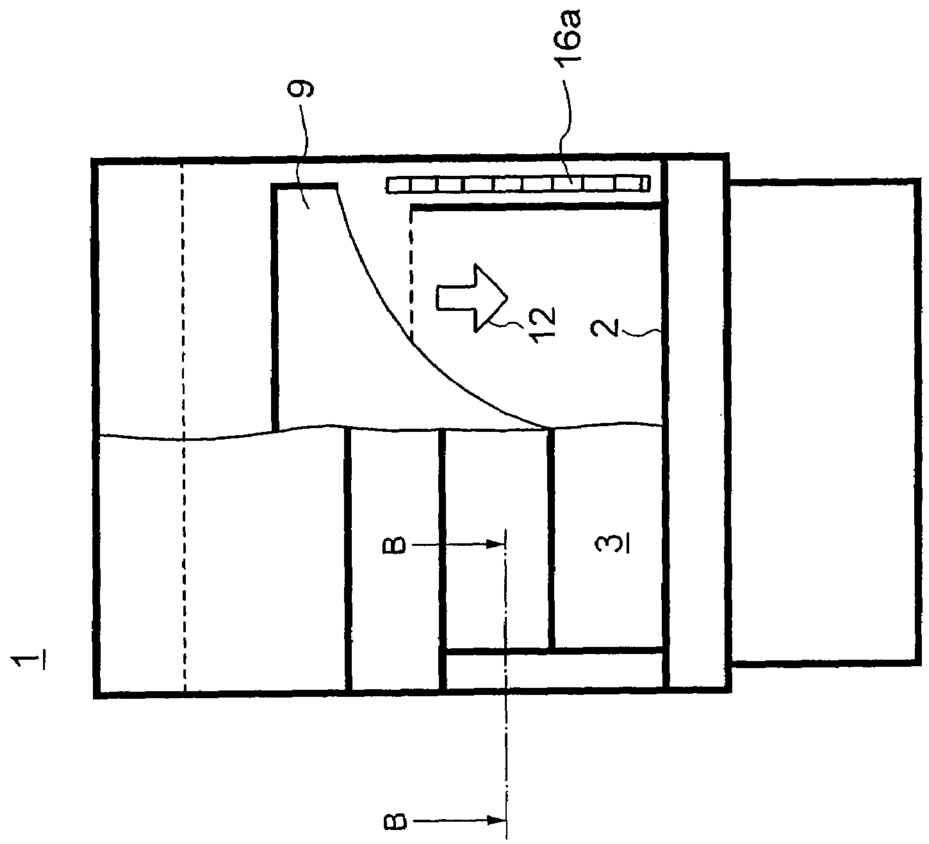
FIG. 5*b* is a partly broken front view illustrating the safety cabinet shown in FIG. 5*a;*
Figure 5A:
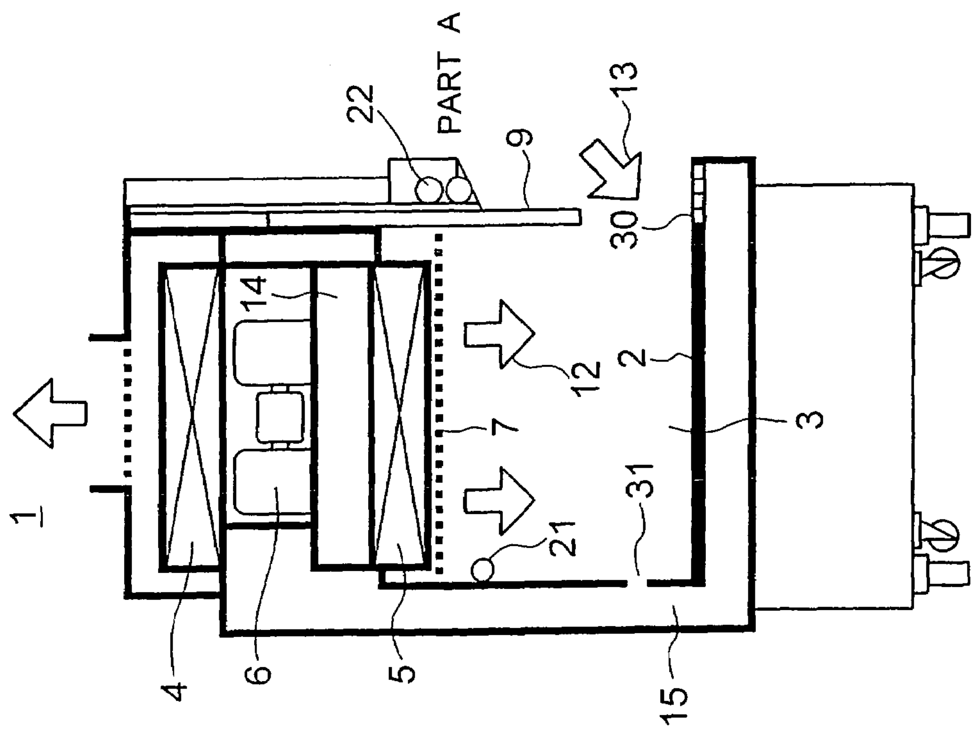
FIG. 5*a* is a vertical sectional view illustrating a safety cabinet in a third embodiment of the present invention.
Figure 6:
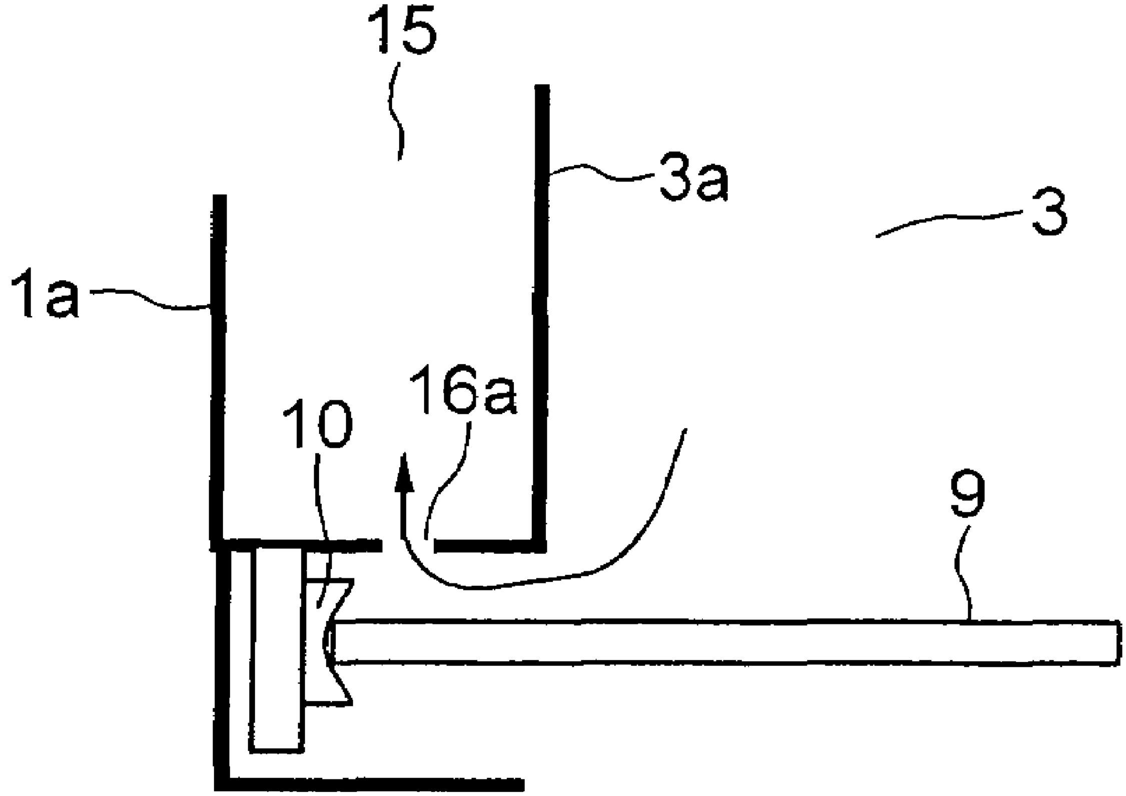
FIG. 6 is an enlarged sectional view along line B-B in FIG. 5*b;*
Figure 7B:
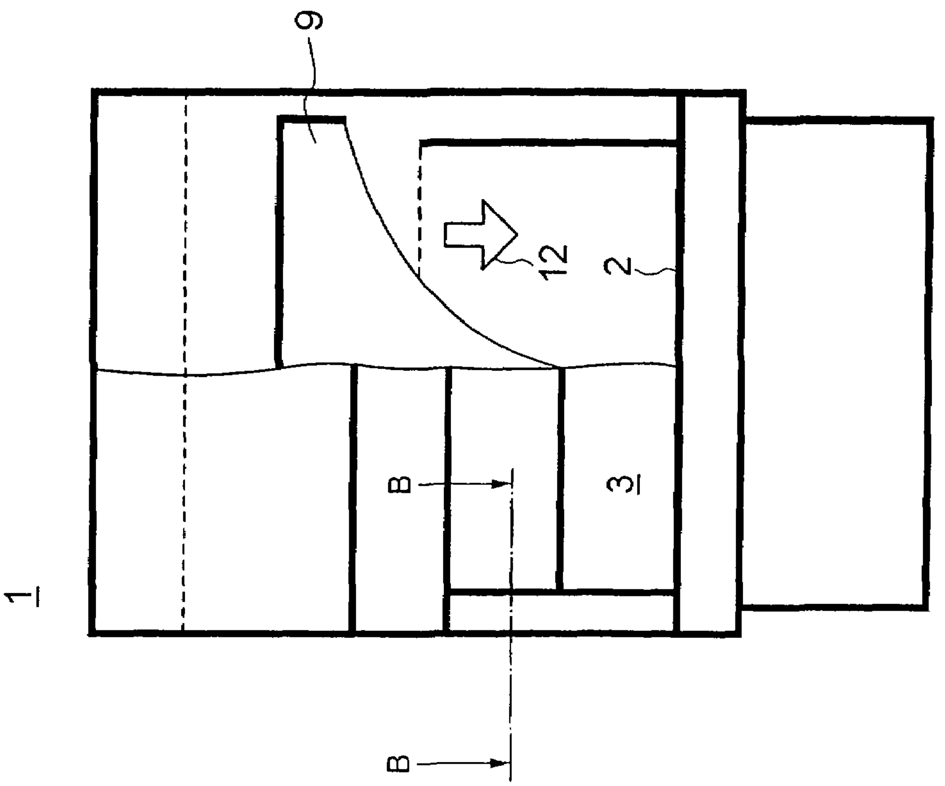
FIG. 7B (BACKGROUND ART)
FIG. 7*b* is a partly broken front view illustrating the safety cabinet shown in FIG. 7*a;*
Figure 7A:
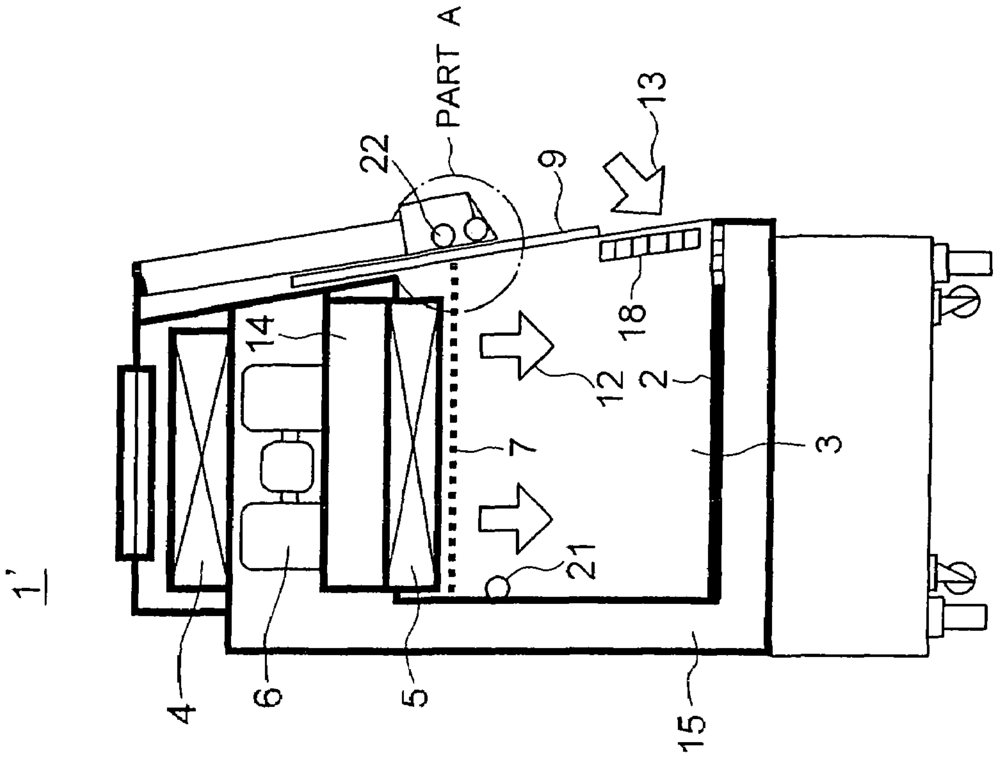
FIG. 7A (BACKGROUND ART)
FIG. 7*a* is a vertical sectional view illustrating a conventional safety cabinet.
Figure 8A:
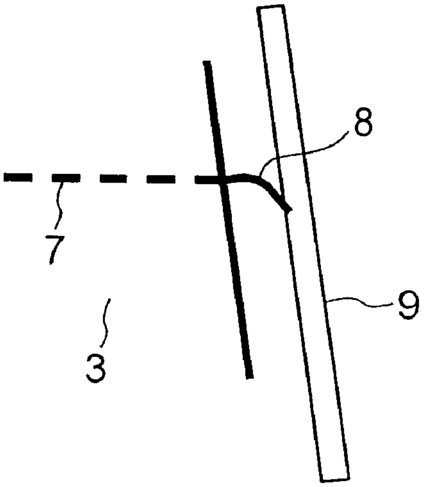
FIG. 8A (BACKGROUND ART)
FIG. 8*a* is an enlarged sectional view illustrating a part A in FIG. 7*a;*
Figure 8B:
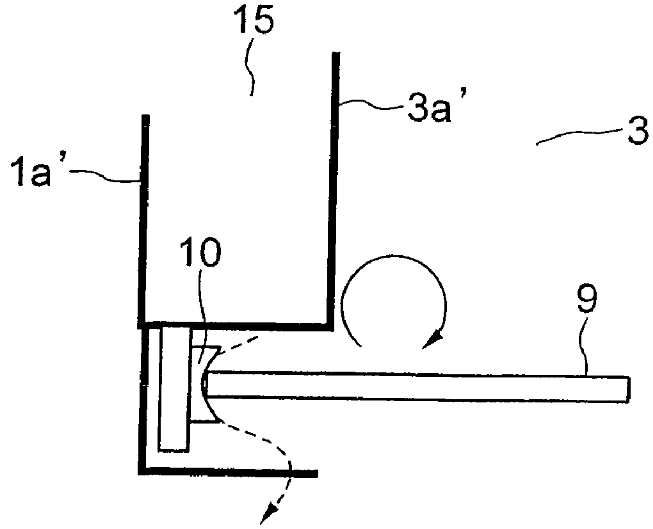
FIG. 8B (BACKGROUND ART)
FIG. 8*b* is an enlarged sectional view along line B-B in FIG. 7*b;*

FIGS. 5*a* to 6 are views for explaining a third embodiment of the present invention. FIG. 5*a* is a vertical sectional view illustrating a safety cabinet, FIG. 5*b* is a front view illustrating the safety cabinet shown in FIG. 5*a*, and FIG. 6 is an enlarged view illustrating a part A in FIG. 5*a*.

Referring to FIGS. 5*a* to 6, there are shown a front shutter 9 which stands in a vertical direction, and air suction ports 16*a* formed in parts which are opposed to the inner surface of the front shutter 9 and which are along the front shutter rails at opposite side parts of the working space 3. No suction ports corresponding to the suction ports 16*b* are provided in the upper side part of the working space 3. The working of the air suction ports 16*a* is the same as that of the second embodiment. The constitution and the working of the other parts in the third embodiment are the same as those in the second embodiment.

With the configuration of the third embodiment, due to the suction of air on the inner surface side of the front shutter 9 by the air suction port 16*a*, the air in the working space 3 can be prevented from leaking through gaps between the front shutter 9 and the front shutter rails 10. As a result, the air in the working space 3 is led through the negative pressure contamination plenum 15 and the exhaust HEPA filter 4 and is then discharged, outside of the safety cabinet, and accordingly, the biological specimens and the pathogenic organisms can be prevented from leaking outside of the safety cabinet, thereby it is possible to prevent infection thereby. Further, disturbance of air streams in corner parts defined by the inner side surfaces 3*a* of the working space 3 and the front shutter 9 can be prevented, and accordingly cross-contamination among different germs in the working space 3 can be prevented. Further, the structure of the body casing which defines therein the negative pressure contamination plenum 15 as a negative pressure passage can be simplified.

Although explanation has been made of such a configuration that the front shutter is provided in only one side surface of the safety cabinet in the above-mentioned embodiment, the present invention should not be limited this configuration. That is, the front shutter may be provided in each of a plurality of side surfaces of the safety cabinet.

Figure 9A:
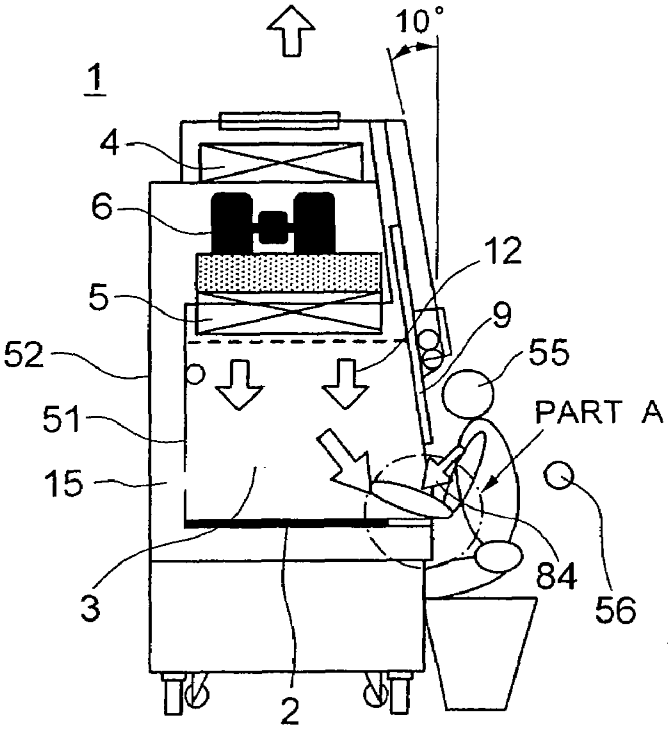
FIG. 9*a* is a vertical sectional view illustrating a safety cabinet in a forth embodiment of the present invention.
Figure 9B:
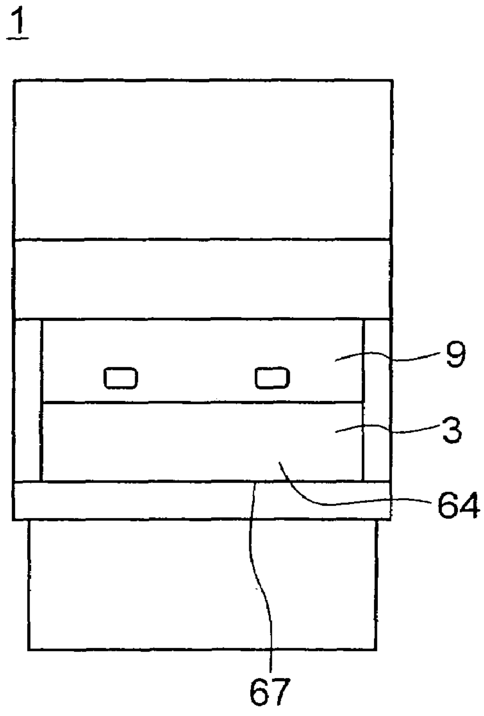
FIG. 9*b* is a partly broken front view illustrating the safety cabinet shown in FIG. 9*a;*
Figure 10A:
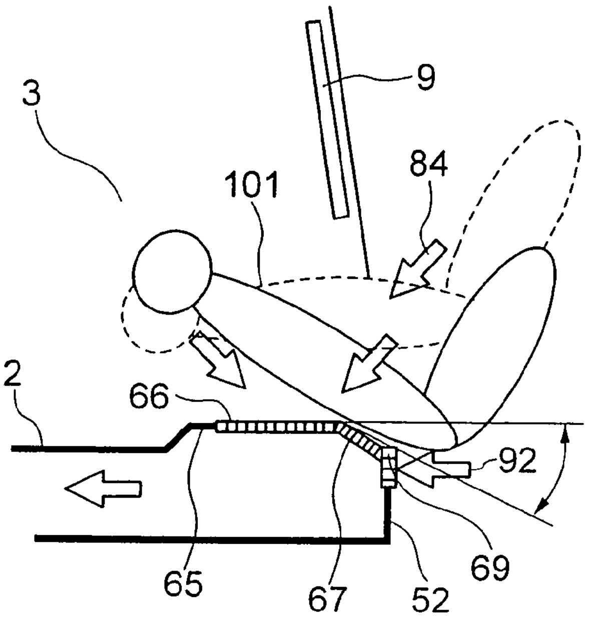
FIG. 10*a* is an enlarged sectional view illustrating a part A in FIG. 9*a:*
Figure 10B:
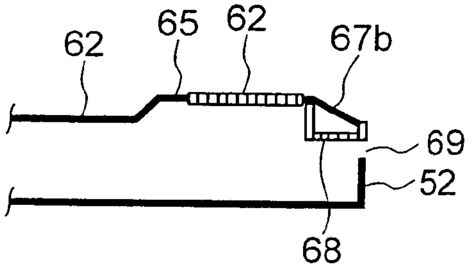
FIG. 10*b* is an enlarged sectional view illustrating a variant form of the part, shown in FIG. 10*a;*
Figure 11:
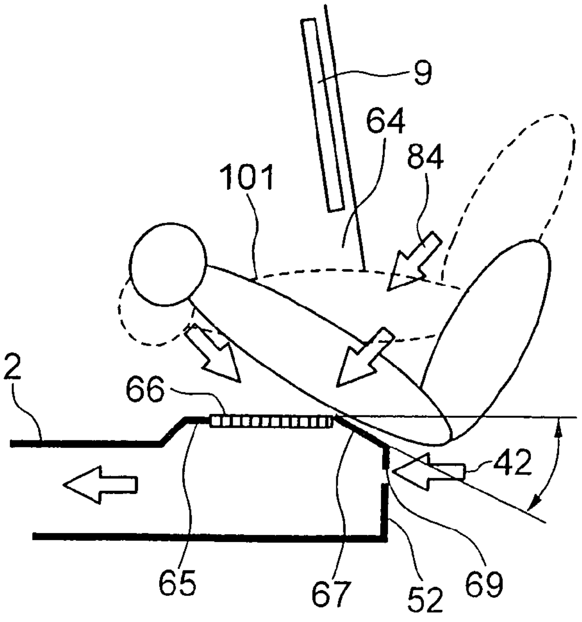
FIG. 11 is a detailed sectional view illustrating a part of a safety cabinet in a fifth embodiment of the present invention.
Figure 12:
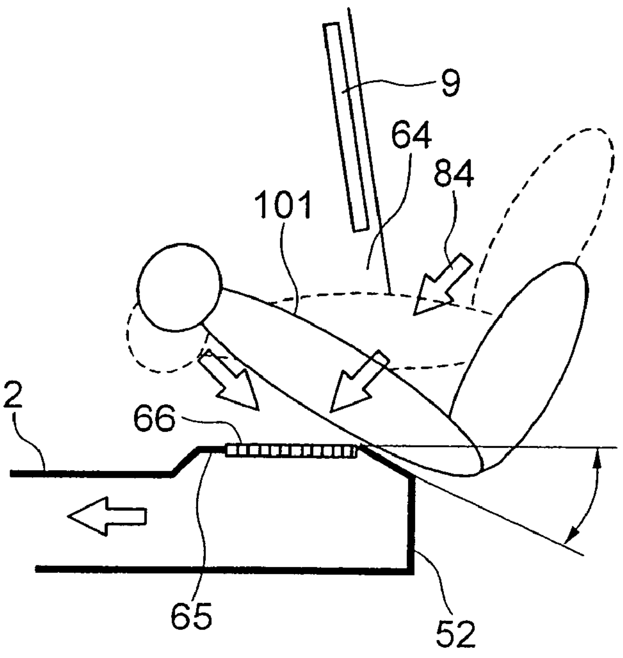
FIG. 12 is a detailed sectional view illustrating a part of a safety cabinet in a sixth embodiment of the present invention.
Figure 13:
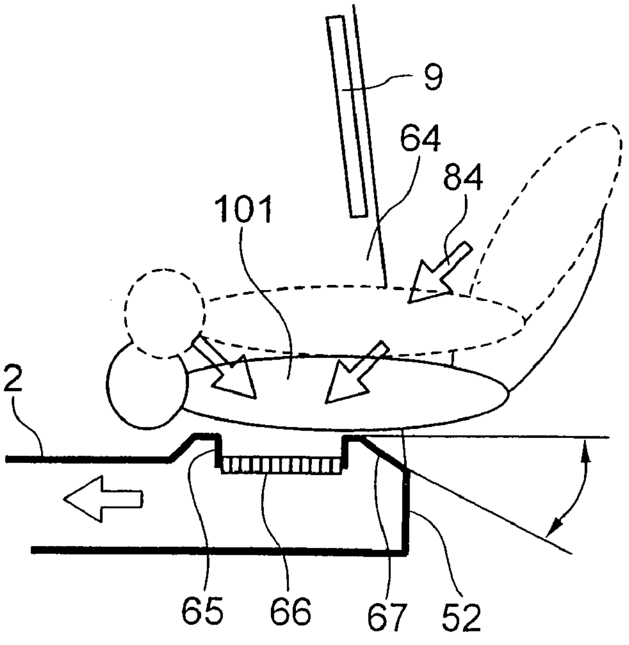
FIG. 13 is a detailed sectional view illustrating a part of a safety cabinet in a seventh embodiment of the present invention.
Figure 14A:
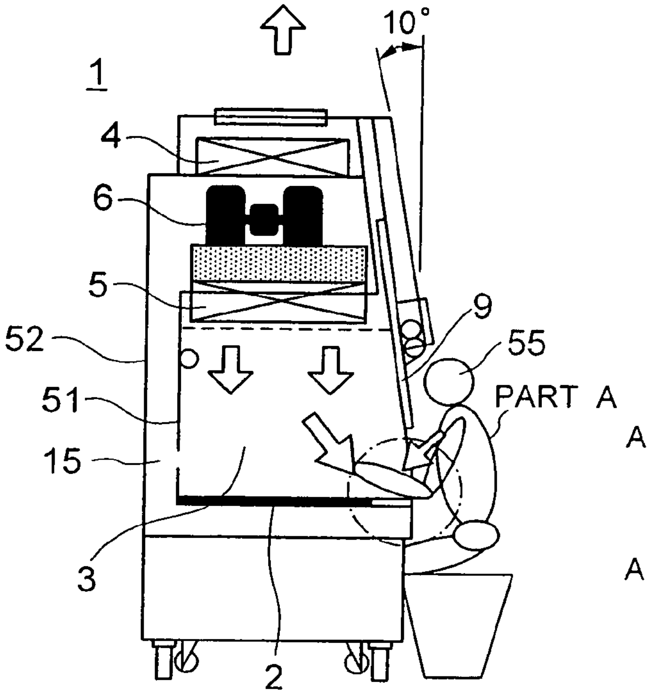
FIG. 14*a* is a vertical sectional view illustrating a safety cabinet in an eight embodiment of the present invention.
Figure 14B:
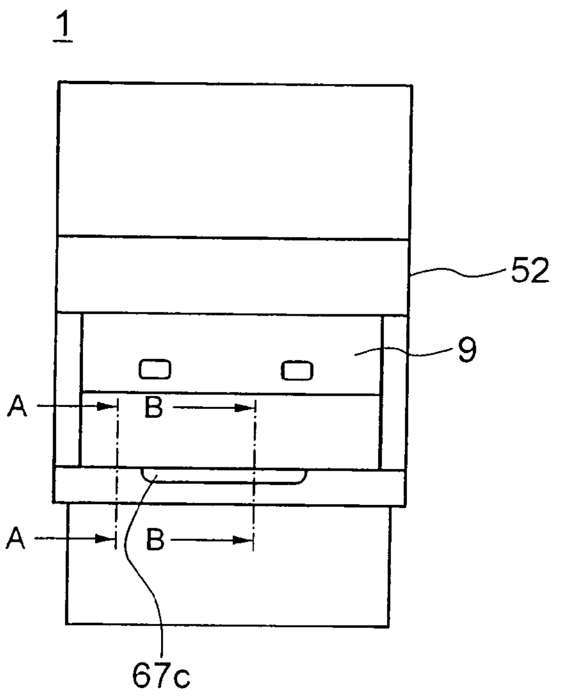
FIG. 14*b* is a partly broken front view illustrating the safety cabinet shown in FIG. 14*a;*
Figure 15:
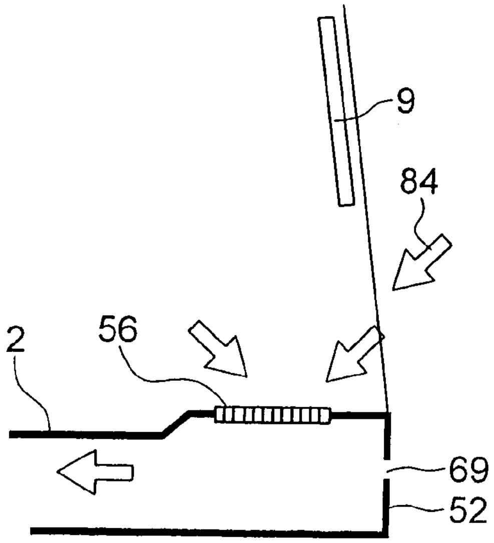
FIG. 15 is a sectional view along line A-A in FIG. 14*b;*
Figure 16:
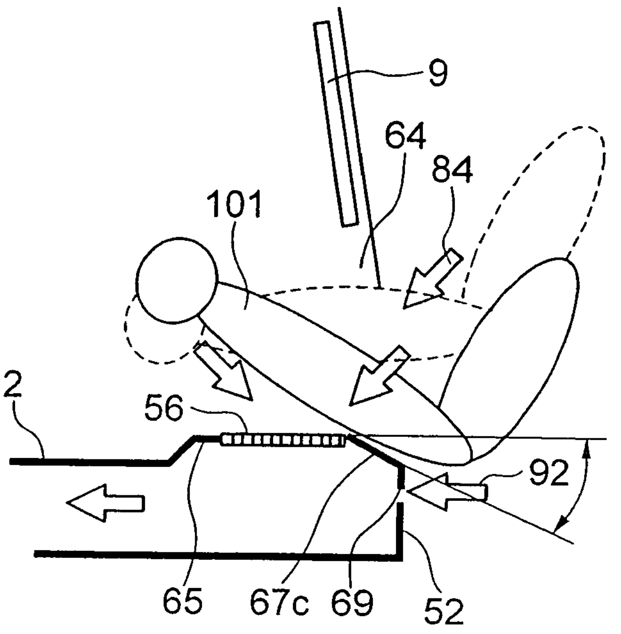
FIG. 16 is a sectional view along line B-B in FIG. 14*b*.
Figure 17:
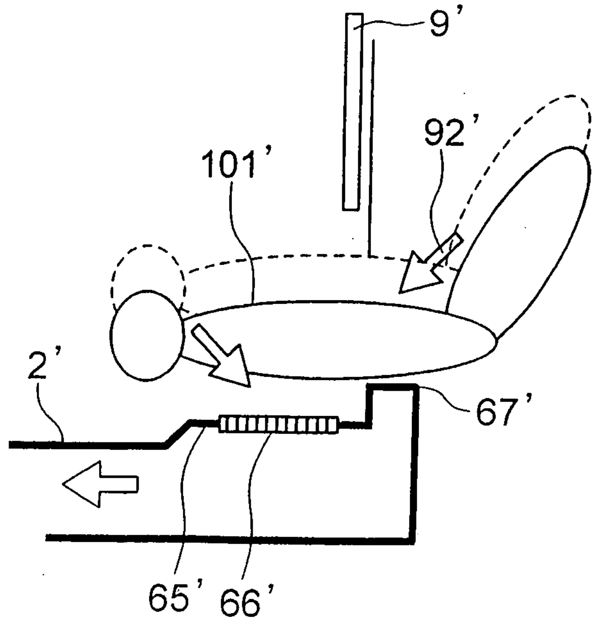
FIG. 17 (BACKGROUND ART)
FIG. 17 is a detailed sectional view illustrating a workbench in a conventional safety cabinet.

Further, explanation will be made of other embodiments of the safety cabinet according to the present invention with reference to FIGS. 9*a* to 16. FIGS. 9*a* and 9*b* are views illustrating a configuration of a safety cabinet in a fourth embodiment of the present invention, and FIGS. 10*a* and 10*b* are detailed views illustrating configurations of parts of the safety cabinets in the fourth embodiment of the present invention. FIG. 11 is a detailed view illustrating a configuration of a part of a safety cabinet in a fifth embodiment of the present invention. FIG. 12 is a detailed view illustrating a configuration of a part of a safety cabinet in a sixth embodiment of the present invention. FIG. 13 is a detailed view illustrating a configuration of a part of a safety cabinet in a seventh embodiment of the present invention. FIGS. 14*a* and 14*b* are views illustrating a configuration of a safety cabinet in an eighth embodiment of the present invention. FIG. 15 is a sectional view along line A-A in FIG. 14*b*, and FIG. 16 is a sectional view illustrating line B-B in FIG. 14*b*.

Explanation will be made of the fourth embodiment. FIGS. 9*a* and 9*b* are a vertical sectional view and the front view, respectively, which show the safety cabinet in the fourth embodiment of the present invention. The safety cabinet in this embodiment incorporates a first housing 51 defining in its upper part a working space 3, and incorporating a workbench 2 formed therein with air suction ports on the front surface side of the working space, a front shutter 9 provided in front of the working space 3 and a front opening 64 formed below the front shutter 9, and a second housing 52 accommodating intake air system equipment for supplying purified air into the working space by way of a first air purifying means 5, and exhaust system equipment for discharging air outside of the safety cabinet, from a circulation passage connected to the working space 3, by way of a second air purifying means 4, and the workbench 2 has an inclined part 67 which is inclined downward further outward thereof, between the air suction ports 65 and the front opening 64. It is noted that the first housing and the second housing may be integrally incorporated with each other. Further, the air suction ports 65 and the inclined part 67 may be formed, separately from the workbench 2.

In the safety cabinet in the fourth embodiment, an air stream 84 sucked through a space below the front shutter 9 flows below the workbench 3 and in rear of the working space 3, and is then sucked into the blower 6. The sucked air is mixed therein with biological specimens and pathogenic organisms handled in the working space 3. Dust 56 outside of the safety cabinet which is led through the front opening 64 below the front shutter 9, being accompanied with the air stream 84, passes below the workbench 2 and in rear of the work space 3, and is finally sucked into the blower 6. Negative pressure is effected on the suction side of the blower 6, and accordingly, the biological specimens and the pathogenic organisms pass therethrough. The thus contaminated space is called as the negative pressure contamination plenum 15. Further, the air blown off from the blower 6 is fed into a closed space. The pressurized air in a closed space connected to the blower 6 is led through the intake air HEPA filter 5 so as to remove dust from the air which is therefore fed into the working space 3 as purified air. It is noted that the intake system equipment may be used, separately from the exhaust equipment.

The air stream 84 sucked through the opening of the working space below the front shutter 9 and the air stream 12 blown into the working space 15 flow through the negative pressure contamination plenum 15. A part of the air flows through the exhaust HEPA filter 4 so as to remove dust including biological specimens and the pathogenic organisms from the air which is then discharged outside of the safety cabinet.

A worker 55 who treats the biological specimens and the pathogenic organisms looks into the working space 6 through the transparent shutter 9 which is inclined by an angle of about 10 deg. and inserts his arms 101 through the front opening 6 below the front shutter 6 into the working space where tests are made.

Explanation will be made of the safety cabinet 3 in this embodiment with reference to a detailed view in FIG. 10*a*. The worker 55 inserts his arms 101 into the working space 3 through the opening below the front shutter 9. The arms 101 at the normal position are indicted by dotted lines. The air in the working space 3 and the inflow air stream 84 sucked through the front opening 64 flow, lapping around the arms 101, and are then sucked through suction slits 66 provided in air suction ports 65. The air stream can prevent leakage of the biological specimens and the pathogenic organisms from the working space, outside of the safety cabinet, and entrance of germs into the working space from the outside thereof.

The air suction ports 65 are formed in a surface parallel with the surface of the workbench 2, and the inclined parts 67 are formed just before the air suction ports 65. The suction slits are attached in the air-suction ports 65 and the inclined parts 67. Further, auxiliary suction ports 69 are formed below the inclined parts 67.

Positions where the air suction ports 65 are formed are higher than the working surface of the workbench 2. Accordingly, even though a laboratory dish (which is not shown) located on the workbench 2 slips toward the air suction ports 65, it is possible to prevent the laboratory dish from blocking the air suction ports 65.

In the safety cabinet in this embodiment, the worker has tired with his arms after long time experiments, and he happens to put his elbows on the workbench so that his arms take a position as indicated by the solid line in FIG. 10*a*. If the elbows makes contact with the inclined parts 67, he cannot feel discomfort as the corners of the inclined parts 67 to which the elbows make contact, are beveled. Further, since the suction slits 66 are formed in the surfaces of the workbench 2 to which the arms 101 make contact, the positions of the arms 101 are held so that the inflow air stream 84 is sucked into the suction slits 66, lapping around the arms 101. Further, since the suction slits are provided also in the inclined parts 67, the air below the workbench is guided around the arms 101, similar to the center of the front opening, and accordingly can be sucked into the suction slits 66 before it flows into the working space 3. With this configuration, even though the worker 55 happens to set his arms 101 on the air suction ports 65, contamination inside and outside of the working space can be prevented. The inclined parts 67 preferably have an inclined angle of 5 to 40 deg with respect to a horizontal direction.

Although explanation has been made as mentioned above such that the suction ports formed in the inclined parts are slit-like, but the present invention should not be limited to this slit-like configuration, but they may be a plurality of holes since the quantity of air sucked into the air suction ports in the inlet surface 7 of the workbench is adapted to change the direction the air stream along the arms 101. Further, as shown in FIG. 10*b*, the suction slits 68 may be attached below the inclined parts 67*b*.

Next, explanation will be made of a fifth embodiment. FIG. 11 is a detailed view illustrating a part of a safety cabinet in the fifth embodiment. In this embodiment, only auxiliary suction holes 69 are formed but no suction slits are provided in the inclined parts 67. With this configuration, even though the worker has tired so as to set his arms 101*a* on the inclined parts 67 after experiments carried out for a long time, the arms does not make contact with the corner parts, and accordingly, the worker does not feel discomfort.

At this time, the air streams flowing along the side surfaces of the arms set onto the workbench (where the sucked air streams 34 do not lap the arms 101) are sucked into the auxiliary air suction ports 69 before they pass along the side surfaces of the arm 101, and accordingly, they can be prevented from entering the working space 3.

In the configuration of the fifth embodiment, since no slits are provided in the inclined parts 67, the safety cabinet can be manufactured at a cost lower than that of the fourth embodiment.

Explanation will be made of sixth embodiment. FIG. 12 is a detailed view illustrating a part of a safety cabinet in the sixth embodiment of the present invention. In comparison with the fifth embodiment, no auxiliary suction ports 69 are present in the sixth embodiment. This configuration is mainly adapted to prevent the worker from feeling discomfort when he has tired so as to rest his arms on the inclined parts 67.

In the above-mentioned fourth to sixth embodiments, by comparing the areas of the air suction ports 65 which is parallel with the surface of the workbench 2, the areas of the auxiliary air suction ports 69 and the areas of the suction slits formed in the inclined parts 67 with one another, the areas of the suction slits which are parallel with the surface of the workbench 2 are largest. Thus, even if the worker rested his arms 101 on the inclined parts in the corner parts of the workbench, the possibility of blocking the suction slits with the arms 101 became less, and accordingly, the quantity of air sucked through the front opening 64 was not affected, appreciably. The inflow velocity of air through the front opening 64 relatively affect the test performance for micro-organisms. For a class II cabinet specified in JIS K3800: 2000 for counter measures against biohazards, it is specified that the inflow air velocity is within ±0.025 m/s.

Explanation will be made of a seventh embodiment. FIG. 13 is a detailed view illustrating a part of a safety cabinet in the seventh embodiment of the present invention. Should the arms 101 of the worker block the surface of the air suction ports 65 which is parallel with the surface of the workbench 2, the air streams sucked through the front opening 65 would be affected. However, in this embodiment, since suction slits 66 are provided below the inlet ports of the air suction ports 65 formed in parallel with the surface of the workbench 2, even though the worker rests his arms in parallel with the surface of the workbench 2, inflow air streams 84 lap the arms 101 before they are led into the suction slits 66, thereby it is possible to prevent the inflow velocity from lowering. Further, since the corner parts of the workbench are inclined, thereby it is possible to prevent the worker from feeling discomfort even though he rests his arms on the inclined parts 67.

Explanation will be made of an eighth embodiment of the present invention. FIGS. 14*a* and 14*b* are structural views illustrating a safety cabinet in the eighth embodiment of the present invention, and FIGS. 15 and 16 are sectional views along line A-A and line B-B in FIG. 4*b*. In the safety cabinet, the position where prevention of cross-contamination among specimens is ensured is specified as the center of the workbench which is distant from each side surface of the working space by not less than 355 mm as in U.S. NSF standards but by not less than 360 mm as in JIS K3800:2000.

Thus, the worker who carries out experiments works on the center side which is distant from each side surface of the working space by not less than 355 mm.

In this embodiment, as shown in FIG. 14*b*, the inclined parts 67*c* are formed on the workbench 2 at positions in the center part of the working space, distant from the opposite side surfaces of the working space at which the germ test performance capable of preventing cross-contamination among specimens is not ensured, by not less than 355 mm. That is, the center part where the inclined parts 67 are provided can ensure the germ test performance capable of preventing cross-contamination among specimens. With this configuration, the worker naturally carry out test works in the center part which is distant from the opposite sides of the working space, without contaminating the biological specimens and pathogenic organisms with other germs.

Thus, according to the present invention, there can be provided a safety cabinet for anti-biohazard, which can minimize contamination even though worker has tired so as to cause deficiency in treatment after testing the biological specimens and the pathogenic organisms for a long time.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A safety cabinet defining therein a working space inside of a front shutter having an inner surface, comprising:

a blower for sucking air and blowing the same, a pressure chamber into which the air is blown from the blower so as to hold a positive pressure therein, a first filter for filtering the air from the pressure chamber, blow-off rectifying vanes for rectifying the air from the first filter and leading the same into the working space, a workbench having an exhaust port and carrying thereon an object to be worked in the working space, a second filter for filtering air to be discharged outside of the safety cabinet, a negative pressure passage formed at a rear side of the working space, for guiding air flowing thereinto from the inside and the outside of the working space under a negative pressure toward the second filter or said blower, a front shutter inclined at an angle to a vertical direction, which inclined angle is in a range of 3 to 45 degrees, and suction ports connected to the negative pressure passage and formed on a surface of a peripheral structure portion surrounding the working space, which is opposed and adjacent to the inner surface of the front shutter, for sucking air between the inner surface of the front shutter and the peripheral structure portion, wherein the suction ports are formed on the surface of the peripheral structure portion above and on opposite sides of the working space, wherein the air sucked from the inside and the outside of the working space and through the air suction ports is led into the negative pressure passage and toward the first and second filters for purification thereof, and is then fed into the working space or discharged outside of the safety cabinet.

2. The safety cabinet according to claim 1, wherein the suction ports comprise through-holes through the surface of the peripheral structure portion.

* * * * *